United States Patent Office 2,739,993
Patented Mar. 27, 1956

2,739,993

CONVERSION OF TOLUENE INTO NAPHTHENES, BENZENE, AND XYLENE

Abraham Schneider, Philadelphia, and William K. Conn, Springfield, Pa., assignors to Sun Oil Company, Philadelphia, Pa., a corporation of New Jersey No Drawing. Application November 12, 1952, Serial No. 320,111

2 Claims. (Cl. 260—667)

This invention relates to the conversion of aromatic hydrocarbons to valuable products, and more specifically relates to the conversion of toluene to other aromatic hydrocarbons and to naphthenes.

Aromatic hydrocarbons including benzene, toluene, and xylene are obtainable from petroleum and coal tar. It is frequently desirable to obtain additional quantities of benezne and xylene, whereas toluene is obtained in excessive amounts. It is also frequently desirable to convert such excessive amounts of toluene to other valuable hydrocarbons, such as naphthenes, which are valuable per se and as chemical intermediates.

An object of the present invention is to convert toluene to naphthenes including cyclopentane and methylcyclopentane. Another object is to convert toluene to benzene and xylenes. A still further object is to provide a process wherein naphthenes, benzene, and xylene are simultaneously prepared from toluene. Other objects will be apparent from the following specification.

It has now been found that by subjecting a mixture of toluene and hydrogen to the action of aluminum chloride, as hereinafter fully described, substantial yields of naphthenes, benzene, and xylene are obtained. It is characteristic of the present process that at least a portion of the naphthenes prepared have a fewer number of carbon atoms than does toluene, i. e., at least a portion of the naphthenes have less than 7 carbon atoms.

In accordance with the present invention, a mixture of toluene and hydrogen is subjected, in the liquid phase at a temperature of from 50 to 300° C., to the action of aluminum chloride. The time of contact with the catalyst is not critical, it being apparent that sufficient time should be allowed to achieve reaction. The optimum time for a given application will vary according to other variables, principally the temperature employed and the toluene to catalyst ratio. In batch operation, a time of contact of from 2 minutes to 5 hours, and preferably from 0.5 to 2 hours gives good results, and in continuous operation a liquid hourly space velocity of from 0.1 to 5 gives good results.

In operating the process an excess of hydrogen must be employed at all times, and by an excess of hydrogen is meant a sufficient quantity thereof so that it is not completely consumed in the reaction. Usually the mole ratio of hydrogen to toluene will be in the range of from 10 to 1000. The presence of relatively large quantities of hydrogen is advantageous in that such operation tends to increase the life of the catalyst. Sufficient aluminum chloride should be employed to obtain substantial quantities of the desired product within a reasonable time. In general, a mole ratio of aluminum chloride to toluene of from 0.1 to 10 gives good results.

The products obtained in the present process are naphthenic hydrocarbons, benzene and xylene. The naphthenes produced, depending upon the reaction conditions employed, are methylcyclohexane, dimethylcyclopentanes, methylcyclopentane, and cyclopentane. These hydrocarbons are valuable per se as solvents and the like, as components of high octane number fuels, and also as chemical intermediates in the preparation of other compounds. The mechanism by which these products are formed is complicated and not fully understood. What is known is that by contacting a mixture of toluene and hydrogen with aluminum chloride as herein described, the said products are produced in substantial yields.

In order to illustrate the process of the present invention, 40 parts by weight of aluminum chloride and 100 parts by weight of toluene were introduced into a contactor. An excess of hydrogen was introduced, the pressure being 500 p. s. i. g. The temperature was maintained at 100° C. and the reaction mixture was agitated for 1 hour. The reaction mixture was then cooled and the hydrocarbons separated from the catalyst. The hydrocarbons were then washed, dried, filtered, and the components separated by distillation. There were recovered 59 parts by weight of unreacted toluene. The remaining portion of the reaction mixture contained the products of the present process, and consisted, in percent by volume, of the following hydrocarbons: a mixture of cyclopentane and methylcyclopentane in about equal parts, 11.1%; methylcyclohexane, 7.6%; benzene, 11.1%; xylenes, consisting of a mixture of isomers, 22.2%; and higher boiling hydrocarbons, 48%.

By increasing the catalyst to toluene ratio, the yields of the stated products are substantially increased. Other variables may be changed within the limits above described and good results obtained therewith. If desired a quantity of hydrogen chloride, from 0.1% to 50% by weight, and preferably from 1% to 10% by weight, based on the quantity of aluminum chloride employed may be used as a catalyst activator. This embodiment is especially valuable when operating at relatively low temperatures within the defined range.

The invention claimed is:

1. Process of converting toluene to naphthenes having less than 7 carbon atoms, benzene and xylenes which comprises contacting, in liquid phase at a temperature of from 50° C. to 300° C., toluene admixed with excess hydrogen in a mole ratio of hydrogen to toluene of from 10 to 1000 with aluminum chloride and hydrogen chloride, wherein the mole ratio of aluminum chloride to toluene is from 0.1 to 10 and the quantity of hydrogen chloride is from 1% to 10% by weight based on the quantity of aluminum chloride employed, and recovering naphthenes having less than 7 carbon atoms, benzene and xylenes from the reaction mixture.

2. Process of converting toluene to naphthenes having less than 7 carbon atoms, benzene and xylenes which comprises contacting, in liquid phase at a temperature of from 50° C. to 300° C., aluminum chloride with toluene admixed with excess hydrogen in a mole ratio of hydrogen to toluene of from 10 to 1000, wherein the mole ratio of aluminum chloride to toluene is from 0.1 to 10, and recovering naphthenes having less than 7 carbon atoms, benzene and xylenes from the reaction mixture.

References Cited in the file of this patent

UNITED STATES PATENTS

| | | |
|---|---|---|
| 1,324,143 | Brooks | Dec. 9, 1919 |
| 1,334,033 | Houlehan | Mar. 16, 1920 |
| 1,365,849 | Ramage | Jan. 18, 1921 |

OTHER REFERENCES

M. Cpoisarow & C. N. Long, Journal Chem. Society, 119, 1806–1810 (1921). Chem. Abstracts, vol. 16, page 420.